April 20, 1926.　　　W. B. ROOD　　　1,581,983

TURNING TOOL

Filed Nov. 5, 1925

WITNESSES
Edw. Thorpe
Franklin J. Foster

INVENTOR
William B. Rood
BY Munn & Co
ATTORNEYS

Patented Apr. 20, 1926.

1,581,983

UNITED STATES PATENT OFFICE.

WILLIAM B. ROOD, OF WARE, MASSACHUSETTS.

TURNING TOOL.

Application filed November 5, 1925. Serial No. 67,081.

*To all whom it may concern:*

Be it known that I, WILLIAM B. ROOD, a citizen of the United States, and a resident of Ware, in the county of Hampshire and State of Massachusetts, United States of America, have invented a new and Improved Turning Tool, of which the following is a full, clear, and exact description.

The turning tool of the present invention, while adapted for a wide range of utility, is primarily designed for turning in the ends of tubular hems, such as are provided in various types of garments for the reception of tapes or similar devices. As a rule, the tubular hem is made longer than the edge of the garment to which it is secured, and it is necessary to turn in the rough projecting ends of the hem as one of the final steps of manufacture.

An object of the invention is to provide a tool of this character which will be highly efficient in use, which may be readily manipulated, which will be simple, practical and rugged in construction, and which may be manufactured with comparative economy.

A further object of the invention is to provide a tool mounting a spindle for the shank of the turner in such a manner that various size turners may be readily supported on the spindle in accordance with the particular class of work to be operated upon by the tool.

With the above noted and other objects in view, the invention consists in certain novel features of construction, and combinations and arrangements of parts, as will be more fully hereinafter set forth and pointed out in the claims. The invention may be more fully understood from the following description in connection with the accompanying drawings, wherein, Fig. 1 is a view in side elevation of the tool, showing the same gripping the outwardly projecting end of a tubular hem.

Figure 1:
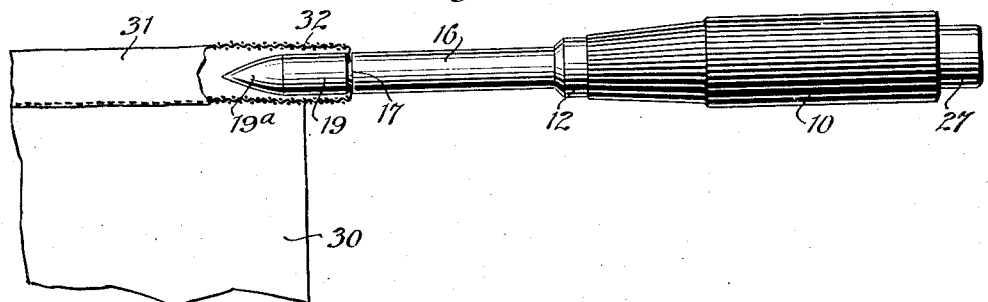

In the drawings I have used the reference character 10 to designate the hollow tool handle which may be of wood, composition, or of any other suitable material. The forward end of the handle is reduced at 11 to accommodate a flange 12 formed on a hollow spindle 13, the flange frictionally fitting the reduced tool end and abutting a shoulder 14 on the handle. Spindle 13 is exteriorly threaded at 15 to receive the internally threaded end of a hollow shank. The shank is externally shouldered at 17 near its outer end, providing a seat for the reception of the cup-like portion 18 of a solid plunger head 19.

The plunger indicated at 20 is provided with a reduced extension 21 extending through the spindle 13 and shank 16, and screwed into the plunger head as at 22. The shoulder 23 at the union of the extension 21 and the plunger body 20, abuts the spindle 13 to limit the outward movement of the plunger and consequently to limit the movement of the plunger head off the shoulder 17 of the shank. The engagement of the plunger head with the shank limits the movement of the plunger in the opposite direction. A coiled expansion spring 24 encircling the plunger 20 is housed within an enlarged portion 25 of the handle bore, this spring abutting a shoulder 26 of the bore, and bearing against the enlarged operating end 27 of the plunger which normally projects out of the hollow handle, is seen in Figs. 1 and 2.

It will be apparent that by grasping the handle 10, and placing the thumb against member 27, the plunger may be projected forwardly to move the head 19 away from the shank 16.

Figure 2:
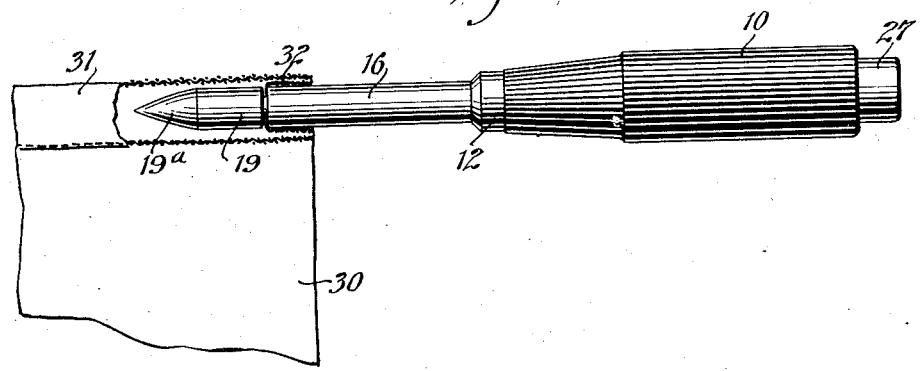
Fig. 2 is a similar view, showing the hem folded inwardly by the tool, and before the raw edge has been released.
Figure 3:
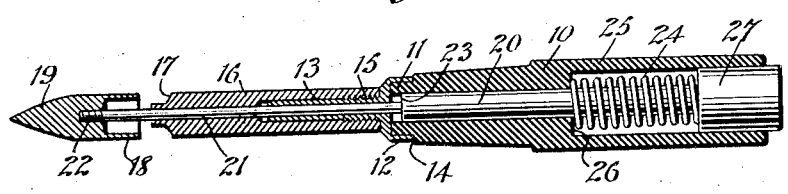
Fig. 3 is a view in longitudinal section through the tool showing the head moved away from the shank by the plunger.

The manner of using the tool may be understood by reference to Figs. 1 and 2 of the drawings. In Fig. 1, a garment indicated at 30 is formed with a tubular hem 31, and in the manufacture of the garment, this hem is provided with a projecting end 32 extending beyond the garment edge. The tool is used for folding the projecting end 32 inwardly within the hem, so that the garment will present a finished appearance. It will be noted that the plunger head 19 is formed with a rounded nose 19$^a$ for conveniently entering the hem 31.

In use, the tool is inserted in the open end of the hem, the member 27 is depressed to separate the head 19 and the shank 16, the raw edge of the hem extension 32 is turned inwardly by hand between the head 19 and the shoulder 17, and when the plunger is released, the spring 24 will serve to pinch the edge of the hem between the cylindrical portion 18 of the plunger head, and the tapered shoulder 17 of the shank. The tool is then moved inwardly to the position of Fig. 2. As it enters the hem, the end 32 is turned inwardly and folded within the main body of the hem. When the position of Fig. 2 has been reached, the plunger is again projected to release the edge of the hem, forced inwardly until such edge clears the shoulder 17, and the plunger released so that the head will spring back and seat on the shoulder 17. Inasmuch as the external diameter of the head is equal to, or slightly less than the external diameter of the shank, there will be no projecting edges to engage the edge of the hem, and unfold it as the tool is withdrawn.

Figure 4:
Fig. 4 is a disassembled view showing a larger sized shank and head which may be associated with the tool of Fig. 3.

It will be evident that the shanks 16 and plunger heads 19 may be made up in a number of sizes, providing of course, that their bores will fit the spindle 13 and plunger rod 21 respectively. In Fig. 4 I show a plunger head 50, and a shank 51 of relatively large size, which may be readily substituted for the plunger head 19 and shank 16.

Various changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claims.

I claim—

1. A portable, manually operable tool of the class described, including a hollow handle, and a hollow spindle secured to one end of the handle, a hollow shank on the spindle, a plunger working through the handle, spindle and shank, a head carried by the plunger and normally seating on the end of the shank, and a spring acting on the plunger to urge the head into engagement with the shank.

2. A portable, manually operable tool of the class described, including a hollow handle, and a hollow spindle secured to one end of the handle, a hollow shank on the spindle, a plunger working through the handle, spindle and shank, a head carried by the plunger and normally seating on the end of the shank, and a spring acting on the plunger to urge the head into engagement with the shank, said plunger having an enlarged operating end projecting through the opposite end of the handle from the end which carries the spindle.

3. A portable, manually operable tool of the class described, including a hollow handle, and a hollow spindle secured to one end of the handle, a hollow shank on the spindle, a plunger working through the handle, spindle and shank, a head carried by the plunger and normally seating on the end of the shank, and a spring acting on the plunger to urge the head into engagement with the shank, said plunger having a shoulder intermediate its ends, abutting the spindle to limit outward movement of the plunger.

4. A device of the class described in claim 1, wherein the plunger head is detachably secured to the plunger, and the hollow shank is detachably secured to the spindle.

5. A tool of the class described including a hollow handle, a hollow externally threaded spindle secured to one end of the handle, a hollow shank screwed on to the spindle, a plunger including a reduced portion guided in the spindle and shank, and an enlarged portion guided in the handle, a head carried by the plunger and normally seating on the end of the shank, a further enlarged thumb operated extension on the plunger normally projecting from a socket in the end of the handle, and a coiled spring in the socket around the plunger bearing against said extension and the shoulder defined by the inner end of the socket.

WILLIAM B. ROOD.